United States Patent Office 3,274,242
Patented Sept. 20, 1966

3,274,242
PREPARATION OF AROMATIC ACID CHLORIDES BY VAPOR PHASE CHLORINATION OF AROMATIC ALDEHYDES
Robert W. Etherington, Jr., Pennington, and William F. Brill, Skillman, N.J., assignors to Petro-Tex Chemical Corporation, Houston, Tex., a corporation of Delaware
No Drawing. Filed May 24, 1962, Ser. No. 197,237
10 Claims. (Cl. 260—544)

This invention relates to aromatic acid chlorides and relates more particularly to the preparation of aromatic acid chlorides by vapor phase reaction of certain aromatic aldehydes with chlorine.

Aryl acid chlorides are prepared commercially by the reaction of phosphorous pentachloride, sulfonyl chloride, thionyl chloride, phosphorous trichloride and the like with aromatic acids. These processes are normally conducted at low temperatures in liquid phase. These reaction conditions often result in polymerization, decarbonylation and ring substitution of aromatic aldehyde and aromatic acid chloride with resulting low yields of the desired acid chloride and low purity. A further disadvantage of such processes is that the by-products in many cases have boiling points or decomposition temperatures in the range of the boiling points of the aromatic acid chloride produced. For example, phosphorous acid which is a by-product of the reaction of phosphorous trichloride with benzoic acid has a decomposition temperature of about 200° C. and benzoyl chloride has a boiling point of about 197° C., thus making separation by distillation difficult. Further, the possibility of hydrolysis of the acid chloride also requires that the reactants and product be kept dry during the reaction and purification operations.

It is an object of this invention to provide an improved process for preparing aromatic acid chlorides which avoids the disadvantages of present commercial processes and provides high purity aromatic acid chlorides from aromatic aldehydes in high yields. Other objects of the invention will be apparent from the disclosure which follows.

It has now been found, quite unexpectedly, that these objects are attained and an improved and efficient process provided for preparing aromatic acid chlorides in high yields and high purities by the reaction in vapor phase at elevated temperatures of certain aromatic aldehydes with chlorine. It was quite unexpected to find that aromatic aldehydes, such as benzaldehyde, could be reacted with chlorine at high temperatures to provide benzoyl chloride in high yields and purities. The man skilled in the art would have expected that under such reaction conditions benzaldehyde would have been decarbonylated and there would have been ring substitution with chlorine. However, for example, it was found that when an excess of chlorine was reacted with benzaldehyde at about 325° C. while maintaining the partial pressure of benzaldehyde at a partial pressure less than one-third atmosphere, as one-sixth atmosphere, substantially quantitative yields of high purity benzoyl chloride were obtained. By means of the novel process of this invention, improved control of the reaction is obtained, and undesired side reactions including ring substitution, polymerization, and decarbonylation of the aromatic aldehyde and reaction product are avoided, and the desired aromatic acid chlorides of high purity are obtained economically in excellent yields using inexpensive chlorine. As compared to the prior art processes, the major inorganic by-product is hydrogen chloride which is readily separated from the aromatic acid chloride since hydrogen chloride boils at −83° C. and benzoyl chloride, for example, boils at 197° C.

Aromatic aldehydes useful in the process of this invention include those wherein an aldehyde group is attached directly to the aryl nucleus. Such aromatic aldehydes contain at least one such aldehyde group, including, for example, benzaldehyde, terephthalaldehyde, phthalaldehyde, isophthaladehyde, and substituted aromatic aldehydes such as ortho-tolualdehyde, metatolualdehyde, para-tolualdehyde, chlorobenzaldehydes, dichlorobenzaldehydes, chloroterephthalaldehydes, and the like. Preferably the aromatic aldehydes have at least one aldehyde group attached directly to a benzene ring and a preferred group may be represented by the general formula

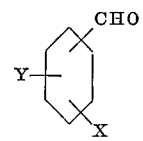

wherein X is hydrogen, a halogen, an alkyl group or an aldehyde group (—CHO); and Y is hydrogen (—H), a halogen or an alkyl group. More preferably, the alkyl groups are methyl (—CH₃), the halogen is chlorine (—Cl), and when X is an aldehyde there may be more than one halogen atom substituted on the ring.

The amount of chlorine and aromatic aldehyde used may be varied under the reaction conditions of this invention but normally there will be at least about a stoichiometric amount of chlorine and aromatic aldehyde used. The use of a molar excess of chlorine to aromatic aldehyde unexpectedly results in higher selectivities and yields of the desired aromatic acid chlorides at lower reaction temperatures. Lesser amounts of chlorine may be used when the partial pressure of the aromatic aldehyde initially and during the course of the reaction is maintained below the equivalent of one-sixth atmosphere when the total pressure is one atmosphere. Molar ratios of chlorine to aromatic aldehyde as high as 10:1 have been used but a molar ratio of chlorine to aromatic aldehyde of from about 5 mols of chlorine per mol equivalent of aldehyde group to about 1.1:1 is preferred. For converting monoaldehydes to monoacid chlorides a molar ratio of about 5 to about one mol of chlorine per mol of aromatic aldehyde has been found useful, and in the case of dialdehydes, a molar ratio of about 10 to 2 mols of chlorine per mol of dialdehyde.

An essential feature of the process of this invention is that the partial pressure of the aromatic aldehyde initially and during the course of the reaction should be below the equivalent of one-third atmosphere when the total pressure is one atmosphere. Under reaction conditions, the aromatic aldehyde preferably is maintained at a partial pressure of less than about one-fifth atmosphere and lower. If the total pressure on the reaction zone is greater than one atmosphere, the absolute values will be increased in direct proportion to the increase in total pressure above one atmosphere. The desired partial pressures are obtained and maintained by techniques known to those skilled in the art and it has been found to be particularly advantageous to maintain the desired partial pressure with inert gaseous materials. The reactants may be diluted with inert gases and vaporized materials to the desired partial pressure of below about one-sixth atmosphere, 5 inches mercury absolute, at atmospheric pressure, and down to a lower limit of practically greater than about one-tenth inch mercury. Any inert or inactive material which is essentially inactive in the presence of the other reactants and reaction products may be employed, and the term gas means in vapor phase at the temperature of reaction. Examples of suitable substantially inert materials are benzene, carbontetrachloride, nitrogen, helium, carbon dioxide, and the like. The amount of inert gas utilized is varied between above about 2:1 to 100:1 mols of gas per mol of aldehyde so long as the partial pressure of the aldehyde is below one-third atmosphere. More preferably, the molar ratio of gas to aldehyde is from about 5:1 to 30:1. The partial pressure of the aromatic aldehyde initially and during the reaction must be maintained at a partial pressure equivalent to less than one-third atmosphere at one atmosphere, preferably less than one-fifth atmosphere. The combined partial pressure of the aromatic aldehyde and aromatic acid chloride will also be less than the equivalent of one-third atmosphere at one atmosphere. The chlorine gas and resulting HCl contribute to maintaining the desired partial pressure of the aldehyde.

The reaction may be conducted at temperatures between above 225° C. to about 575° C. while good results have been obtained at temperatures between about 250° C. and 550° C., the reaction is preferably maintained at between 300° C. and 450° C. The higher temperatures are normally employed with aromatic aldehydes having higher boiling points. For example, when benzaldehyde or tolualdehyde are employed, reaction temperatures of about 300° C. to 400° C. are useful, and with terephthalaldehyde, excellent results are obtained at reaction temperatures of from about 350° C. to about 450° C.

While the flow rates of reactants may be varied widely, good results have been obtained with contact or residence times between about 0.1 to 3 seconds at reaction temperatures of 275° C. to 550° C. Normally the shortest contact time consonant with optimum yields and operating conditions is desired and is readily determined by those skilled in the art, it being understood, of course, at higher temperatures and longer residence times degradation of the organic reaction and products may occur, and at shorter contact times and lower temperatures, lower yields may be obtained. A variety of reactors may be used so long as the reactor system is provided with an effective means of heat removal. Unpacked tubular reactors of small diameter or packed tubular reactors of large diameter may be employed. The reactants may be introduced into the reactor either separately or mixed. It is generally preferred to preheat and introduce the reactants separately into the reactor. The acid chlorides are readily recovered from the effluent by condensation followed by distillation or any other suitable means of purification.

*Example 1*

The reactor employed in this example consisted of a concentric ¾-inch I.D. stainless steel tube 40 inches in length and containing an annular ¼-inch I.D. thermowell 39 inches in length. 35 inches of the reactor tube was enclosed by a circular electric furnace. Approximately the first 10 inches of the reactor served as the preheat and mixing zone for the reactants. The lower 25 inches was the reaction zone for the chlorination reaction and this zone contained 25 cubic centimeters of ⅛″ x ⅛″ Alundum pellets. The volume of the heated section of the reaction was 230 cubic centimeters and the remaining 20 cubic centimeters of Alundum pellets occupied the lower unheated portion of the reactor. The reaction temperature was recorded and controlled by a thermocouple in the thermowell. The reactor gas effluent was analyzed chromatographically. Benzaldehyde, chlorine and nitrogen in a molar volume of 7.7 percent benzaldehyde, 15.1 percent chlorine and 77.2 percent nitrogen were fed into the reactor at a rate to maintain a residence time of 0.7 second. The reaction was conducted at a temperature of about 325° C. By analysis, it was found that under these reaction conditions 92.1 percent of the benzaldehyde was converted to benzoyl chloride having a purity of 99.0 percent.

When Example 1 was repeated with a greatly reduced molar volume of nitrogen so that the initial partial pressure of benzaldehyde was above one-fifth atmosphere, reduced yields of benzoyl chloride, in the range of about 25 percent, were obtained at reduced selectivity; and when a molar excess of benzaldehyde with relation to chlorine was used under the same conditions, the yield of benzoyl chloride was only about 25 percent.

*Example 2*

Terephthalaldehyde, chlorine and nitrogen were fed separately into a Vycor reactor consisting of a 1.1-inch I.D. Vycor tube 27.6 inches long having a halogen inlet 7.9 inches from the top of the Vycor reactor. An annular thermowell consisting of a ¼-inch stainless steel tubing extended throughout the length of the reactor. The reactants were fed to the reactor in concentrations of molar volume of 5.6 percent terephthalaldehyde, 29.7 percent chlorine and 64.7 percent nitrogen at a rate to obtain a residence time of 1.2 seconds. The reactor was maintained at a temperature of 401° C. During this reaction 38.9 percent of terephthalaldehyde was converted to terephthaloyl chloride at a selectivity of 93.6 percent having a yield of 36.3 percent terephthaloyl chloride of high purity.

*Example 3*

Para-tolualdehyde, chlorine and nitrogen were fed into the Vycor reactor in amounts of molar volume of 10.7 percent para-tolualdehyde, 11.4 percent chlorine and 77.9 percent nitrogen at a flow rate to maintain the residence time at 0.5 second. The reaction was conducted at a temperature of 370° C. 61.5 percent of the para-tolualdehyde was converted to para-toluoyl chloride at a selectivity of 75.6 percent for a yield of 46.5 percent. When this example is repeated with phthalaldehyde and isophthalaldehyde, good yields of phthaloyl chloride and isophthaloyl chloride may be obtained.

Aromatic acid chlorides are important commercially as intermediates in production of organic peroxides and dye intermediates. Benzoyl chloride is important in acylation processes whereby a benzoyl group may be added to phenols, alcohols, amines and the like. Benzophenone is readily prepared from benzoyl chloride in benzene with aluminum trichloride.

We claim:
1. A process for preparing aromatic acid chlorides which comprises reacting in the vapor phase at a temperature above 225° C. chlorine with an aromatic aldehyde of the formula

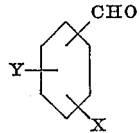

wherein X is selected from the group consisting of hydrogen, halogen, —$CH_3$ and —CHO, and Y is selected from the group consisting of hydrogen, halogen and —CHO, and wherein chlorine is present in a molar ratio from about 10 to greater than one mol of chlorine per mol of aromatic aldehyde at a partial pressure of said aromatic aldehyde equivalent to less than one-third atmosphere.

2. The process of claim 1 wherein the process is conducted at a temperature from 250° C. to 550° C. in the presence of an inert gas at a partial pressure of said aromatic aldehyde equivalent to less than one-fifth atmosphere at one atmosphere.

3. The process for preparing toluoyl chloride which comprises reacting chlorine with tolualdehyde in a vapor state at a temperature between about 300° C. to 500° C. in the presence of an inert gas in amount from five to 30 mols of gas per mol of tolualdehyde at a molar ratio from about five to 1.5 mols of chlorine per mol of tolualdehyde.

4. A process for preparing aromatic acid chlorides which comprises reacting chlorine with an aromatic aldehyde selected from the group consisting of benzaldehyde and terephthalaldehyde in a vapor state at a temperature between about 300° C. and 450° C. in the presence of an inert gas in amount ranging from 5 to 50 mols of inert gas per mol of aromatic aldehyde at a molar ratio from about 10 to greater than one mol of chlorine per mol of aromatic aldehyde.

5. A process for preparing benzoyl chloride which comprises reacting chlorine with benzaldehyde at a temperature between 250° C. and 550° C. in vapor phase at a partial pressure of benzaldehyde equivalent to less than one-fifth atmosphere at one atmosphere, the molar ratio of chlorine to benzaldehyde being from about 5 to greater than one mol of chlorine per mol of benzaldehyde.

6. A process for preparing benzoyl chloride which comprises reacting chlorine with benzaldehyde in vapor state at a temperature between about 300° C. to 400° C. in the presence of a substantially inert gas in amount of five to 30 mols of gas per mol of benzaldehyde, at a molar ratio of about 5 to 1.1 mols of chlorine per mol of benzaldehyde.

7. The process of claim 6 wherein the inert gas is nitrogen.

8. The process of preparing benzoyl chloride which comprises reacting chlorine with benzaldehyde in a molar ratio of from 1.5 to 3 mols of chlorine per mol of benzaldehyde, in a vapor state at a temperature between about 300° C. to 350° C., in the presence of from 5 to 15 mols of nitrogen per mol of benzaldehyde.

9. The process for preparing terephthaloyl chloride which comprises reacting chlorine with terephthalaldehyde at a temperature between about 300° C. to 500° C. in the presence of an inert gas in amount from five to 30 mols of gas per mol of terephthalaldehyde at a molar ratio from about 10 to 2 mols of chlorine per mol of terephthalaldehyde.

10. The process of claim 9 wherein the inert gas is nitrogen.

References Cited by the Examiner
UNITED STATES PATENTS

| | | | |
|---|---|---|---|
| 1,851,832 | 3/1932 | Henderson et al. | 260—544 |
| 1,880,169 | 9/1932 | Bennett et al. | 260—544 |
| 2,006,335 | 7/1935 | Conover | 260—544 |
| 2,018,350 | 10/1935 | Drossbach et al. | 260—599 |

OTHER REFERENCES

Engelsma et al., "Rec. Trav. Chim.," vol. 80, pp. 537–544, June 1961.

Gilman, "Organic Synthesis," coll. vol. 1, 2nd ed. (1941), p. 155.

Kiessling, Ger. app. No. 1,039,053 (KL 120–14), September 1958.

LORRAINE A. WEINBERGER, *Primary Examiner.*

LEON ZITVER, *Examiner.*

R. K. JACKSON, *Assistant Examiner.*